(12) United States Patent
Morris

(10) Patent No.: US 7,460,365 B2
(45) Date of Patent: Dec. 2, 2008

(54) INTERPOSER FOR A DRIVE BAY

(75) Inventor: William Morris, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 11/537,695

(22) Filed: Oct. 2, 2006

(65) Prior Publication Data

US 2008/0080129 A1    Apr. 3, 2008

(51) Int. Cl.
*G06F 1/16* (2006.01)
(52) U.S. Cl. ........................... 361/685; 361/683
(58) Field of Classification Search ............... 361/685, 361/683; 312/223.1, 332.1; 439/61, 928.1, 439/64
See application file for complete search history.

(56) References Cited

U.S. PATENT DOCUMENTS

| | | | | |
|---|---|---|---|---|
| 5,340,340 | A | * | 8/1994 | Hastings et al. ............... 439/64 |
| 5,668,696 | A | * | 9/1997 | Schmitt ...................... 361/685 |
| 6,008,984 | A | * | 12/1999 | Cunningham et al. ....... 361/685 |
| 6,088,221 | A | * | 7/2000 | Bolognia .................... 361/685 |
| 6,580,604 | B1 | | 6/2003 | McAnally et al. |
| 6,876,547 | B2 | | 4/2005 | McAlister |
| 6,882,525 | B2 | | 4/2005 | Paul et al. |
| 6,906,918 | B2 | | 6/2005 | Rabinovitz |

* cited by examiner

*Primary Examiner*—Michael C Zarroli
(74) *Attorney, Agent, or Firm*—Haynes and Boone, LLP

(57) ABSTRACT

An interposer apparatus includes a secondary drive chassis including dimensions such that the secondary drive chassis is operable to couple to a drive bay without the use of a tool and be housed in a primary drive housing defined by the drive bay. The primary drive housing includes a first housing volume. A secondary drive housing is defined by the secondary drive chassis, the secondary drive housing including a second housing volume that is smaller than the first housing volume. A secondary drive coupling mechanism on the secondary drive chassis is operable to couple a secondary drive to the secondary drive chassis and in the secondary drive housing without the use of a tool. The secondary coupling mechanism may be activated to release the secondary drive from the secondary drive chassis while the secondary drive chassis is still coupled to the drive bay and housed in the primary drive housing defined by the drive bay. The interposer apparatus may be coupled to a drive bay to allow secondary drives that would not, by themselves, couple to the drive bay in the primary drive housings. The secondary drives may then be released from the interposer apparatus and the drive bay without removing the interposer apparatus from the drive bay.

18 Claims, 13 Drawing Sheets

INTERPOSER FOR A DRIVE BAY

BACKGROUND

The present disclosure relates generally to information handling systems, and more particularly to an interposer for a drive bay in an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Typically, IHSs are housed in an IHS chassis. It may be desirable to provide for the coupling of drives to the IHS chassis and the IHS in order to increase the functionality of the IHS. The coupling of the drives to the IHS can raise a number of issues.

Conventionally, a drive bay is included in the IHS chassis that allows drives to be coupled to the IHS chassis and the IHS. It is economical to provide the drive bay such that a number of different type and size drives may be coupled to the IHS chassis. This is accomplished by dimensioning the drive bay to include drive housings that may house the largest of the drives that may be housed in the drive bay. When smaller drives must be coupled to the drive bay, a drive chassis, or interposer, is provided that is fastened to the smaller drive such that the smaller drive includes the dimensions that allow it to coupled to the drive bay. Fastening these drive chassis to the smaller drives is a time consuming process as it must be done to each smaller drive that is to be housed in the drive bay, greatly complicating and slowing the manufacturing of the IHS. Furthermore, the drive chassis and drive must be removed from the drive bay and the drive chassis must be unfastened from the drive in order to, for example, service or ship the drive.

Accordingly, it would be desirable to provide an interposer for a drive bay absent the disadvantages found in the prior methods discussed above.

SUMMARY

According to one embodiment, an interposer apparatus includes a secondary drive chassis including dimensions such that the secondary drive chassis is operable to couple to a drive bay without the use of a tool and be housed in a primary drive housing defined by the drive bay, the primary drive housing including a first housing volume, a secondary drive housing defined by the secondary drive chassis, the secondary drive housing including a second housing volume that is smaller than the first housing volume, and a secondary drive coupling mechanism on the secondary drive chassis that is operable to couple a secondary drive to the secondary drive chassis and in the secondary drive housing without the use of a tool, whereby the secondary coupling mechanism may be activated to release the secondary drive from the secondary drive chassis while the secondary drive chassis is still coupled to the drive bay and housed in the primary drive housing defined by the drive bay.

BRIEF DESCRIPTION OF THE DRAWINGS

FIG. 2b is a rear perspective view illustrating an embodiment of the drive bay of FIG. 2a.

FIG. 3b is a side view illustrating an embodiment of the interposer apparatus of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
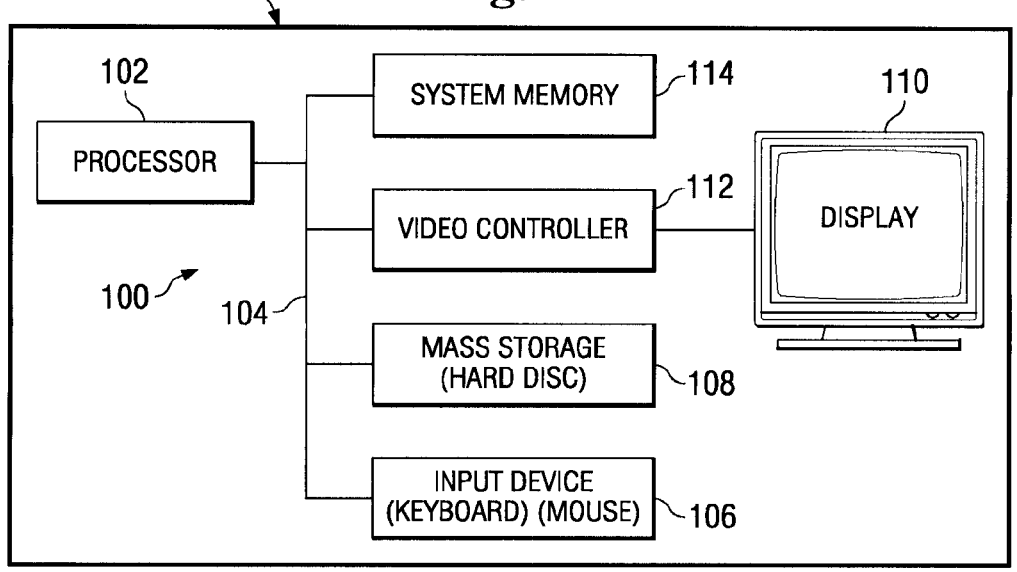
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
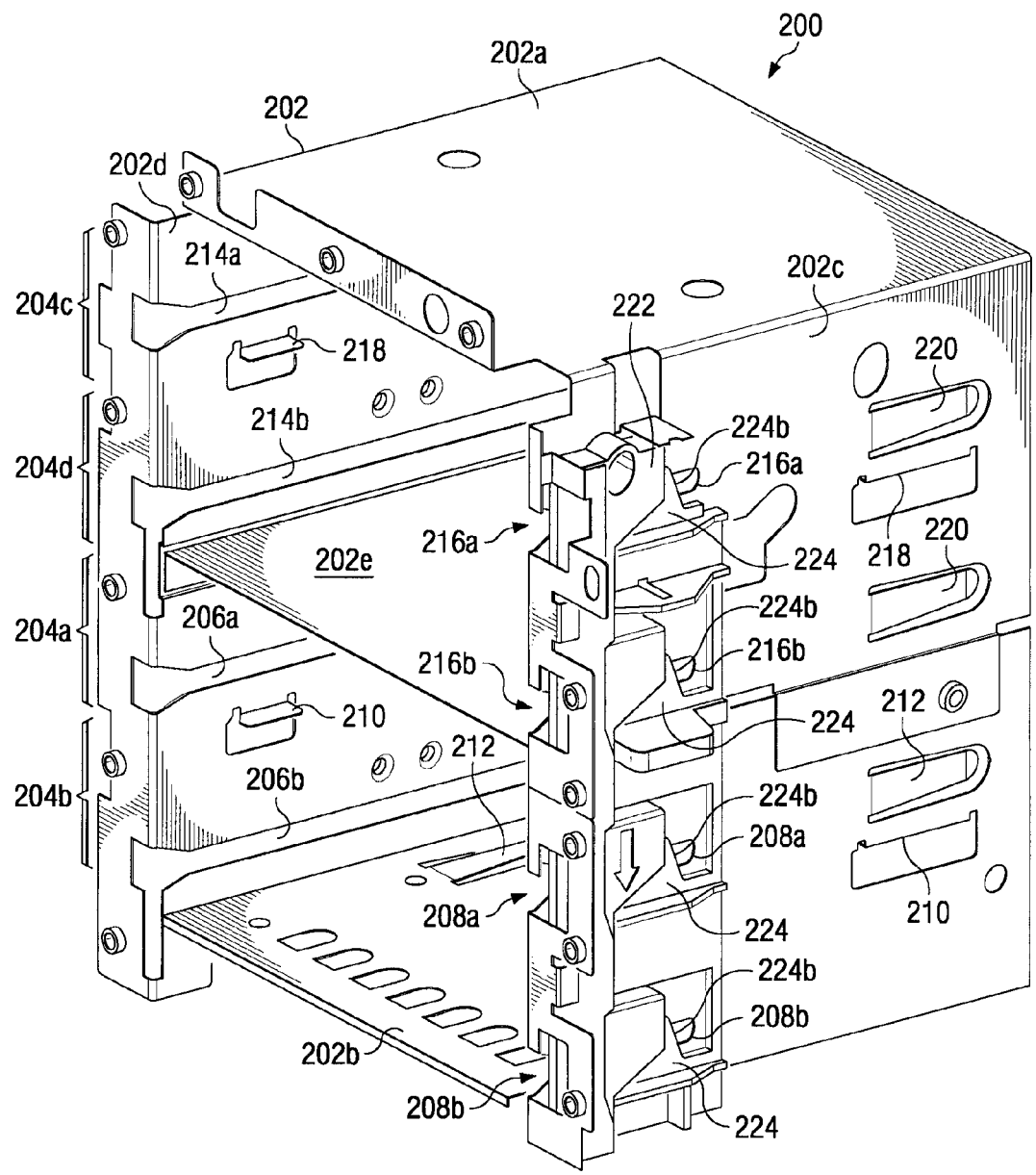
FIG. 2a is a front perspective view illustrating an embodiment of a drive bay.
Figure 2B:
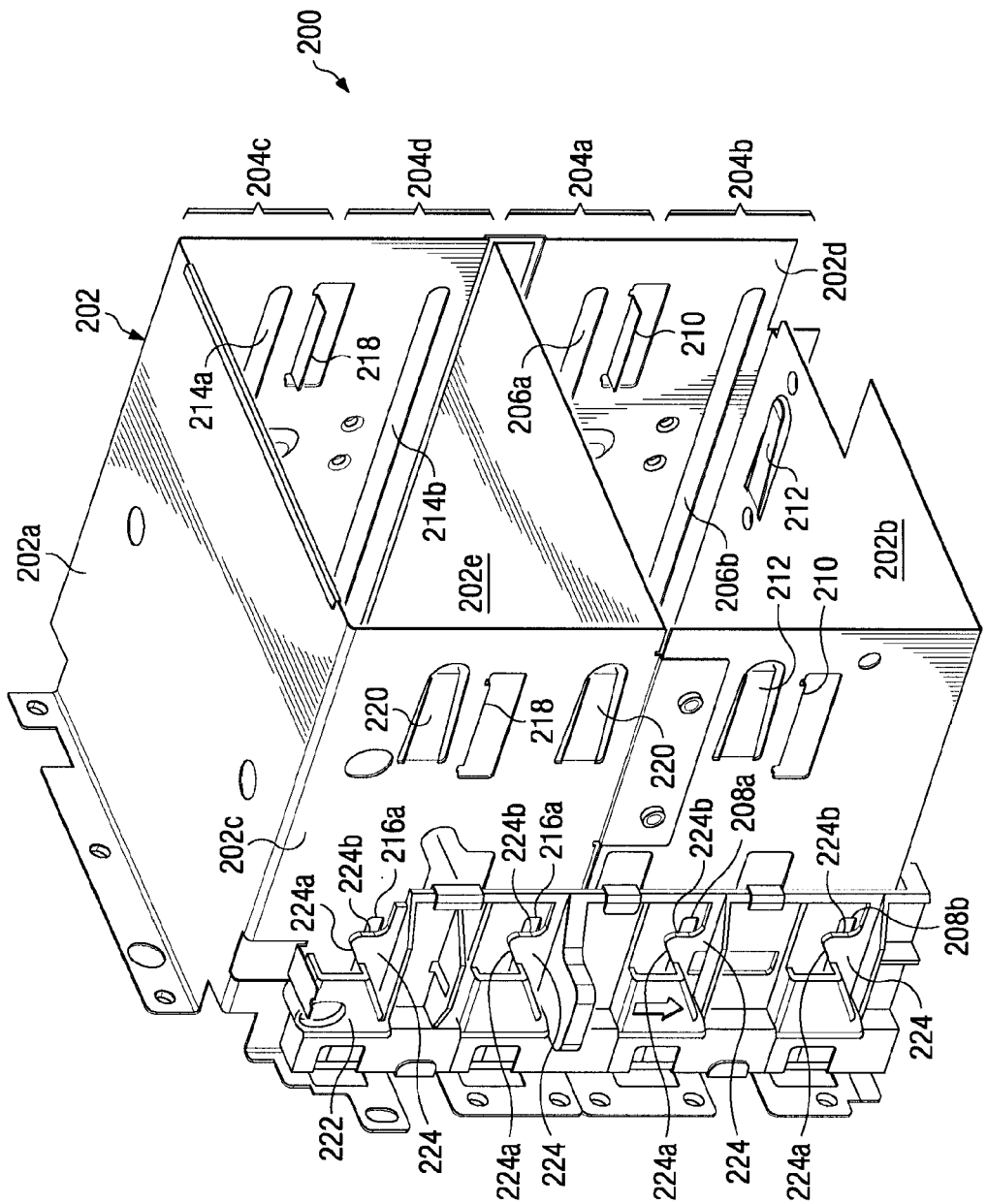

Referring now to FIGS. 2a and 2b, a drive bay 200 is illustrated. The drive bay 200 includes a base 202 having a top wall 202a, a bottom wall 202b located opposite the top wall 202a, a pair of opposing side walls 202c and 202d extending between the top wall 202a and the bottom wall 202b, and a middle wall 202e extending between the side walls 202c and 202d and located substantially midway between and parallel to the top wall 202a and the bottom wall 202b. A pair of primary drive housings 204a and 204b are defined between the bottom wall 202b, the side walls 202c and 202d, and the middle wall 202e and are located immediately adjacent each other. Each primary drive housing 204a and 204b includes a first housing volume that is approximately equal to half the volume defined between the bottom wall 202b, the side walls 202c and 202d, and the middle wall 202e when the volume defined between the bottom wall 202b, the side walls 202c and 202d, and the middle wall 202e is divided by a plane located midway between and substantially parallel to the bottom wall 202b and the middle wall 202e. A pair of primary drive housings 204c and 204d are defined between the top wall 202a, the side walls 202c and 202d, and the middle wall 202e and are located immediately adjacent each other. Each primary drive housing 204c and 204d includes a first housing volume that is approximately equal to half the volume defined between the top wall 202a, the side walls 202c and 202d, and the middle wall 202e when the volume defined between the top wall 202a, the side walls 202c and 202d, and the middle wall 202e is divided by a plane located midway between and substantially parallel to the top wall 202a and the middle wall 202e.

A pair of drive channels 206a and 206b are defined by the side wall 202d and located adjacent the primary drive housings 204a and 204b, respectively. A pair of drive channels 208a and 208b are defined by the side wall 202c, located adjacent the primary drive housings 204a and 204b, respectively, and are substantially aligned with the drive channels 206a and 206b, respectively. A plurality of support features 210 extend from the side walls 202c and 202d adjacent the primary housings 204a and 204b and separate the primary housing 204a from the primary housing 204b. A plurality of interference fit features 212 are located on the side wall 202c and the bottom wall 202b and adjacent the primary housings 204a and 204b. A pair of drive channels 214a and 214b are defined by the side wall 202d and located adjacent the primary drive housings 204c and 204d, respectively. A pair of drive channels 216a and 216b are defined by the side wall 202c, located adjacent the primary drive housings 204c and 204d, respectively, and are substantially aligned with the drive channels 214a and 214b, respectively. A plurality of support features 218 extend from the side walls 202c and 202d adjacent the primary housings 204c and 204d and separate the primary housing 204c from the primary housing 204d. A plurality of interference fit features 220 are located on the side wall 202c and adjacent the primary housings 204a and 204b. A primary drive coupling mechanism 222 is moveably coupled to the drive bay 200 and located adjacent the side wall 202c such that it is operable to move substantially perpendicularly to the top wall 202a, the bottom wall 202b, and the middle wall 202e. The primary drive coupling mechanism 222 may be resiliently biased into the position illustrated in FIGS. 2a and 2b. The primary drive coupling mechanism 222 includes a plurality of securing members 224, each located adjacent one of the drive channels 208a, 208b, 216a, and 216b. Each securing member 224 includes a beveled surface 224a and a securing surface 224b located adjacent the beveled surface 224a.

Figure 3A:
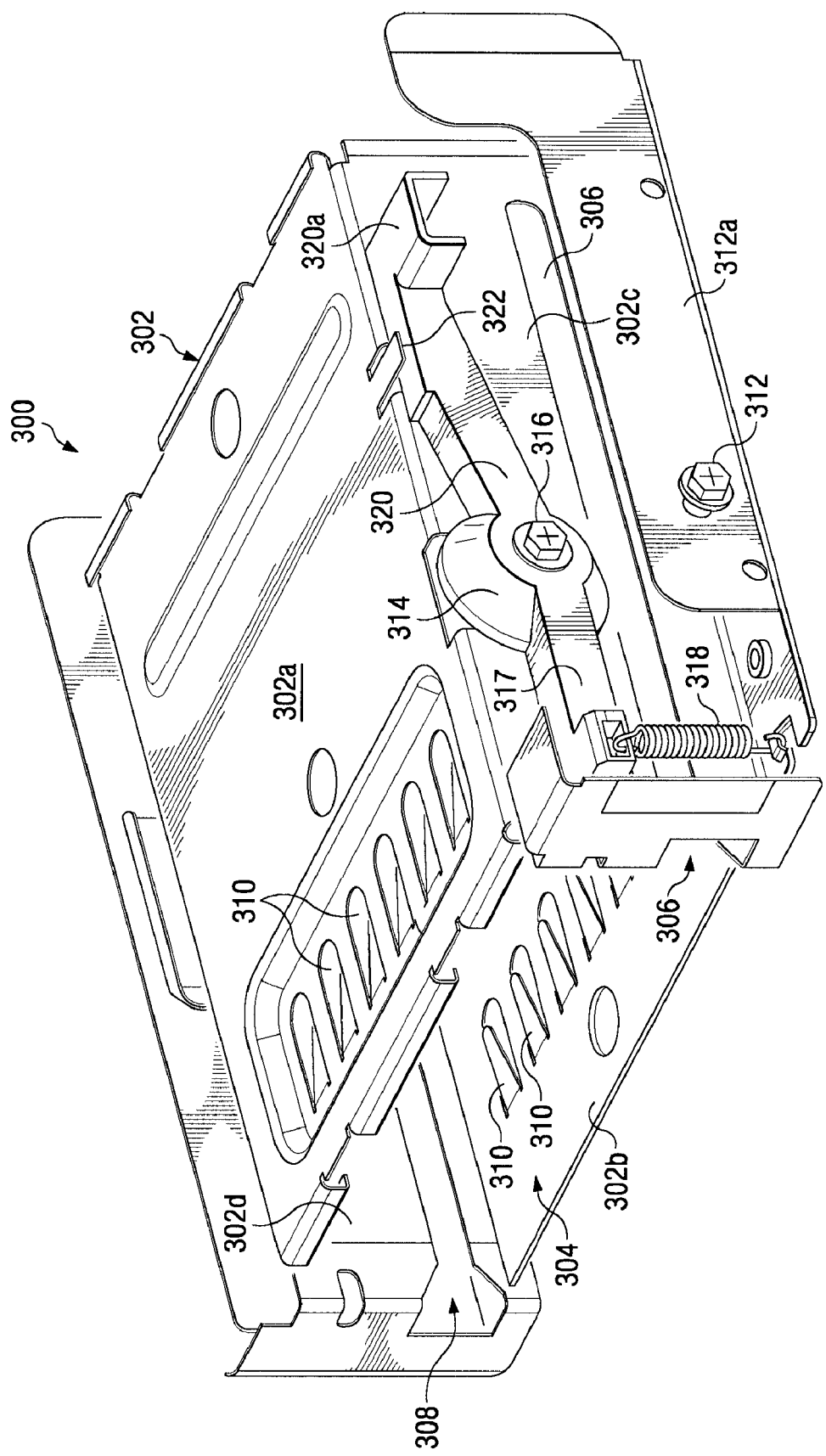
FIG. 3a is a perspective view illustrating an embodiment of an interposer apparatus used with the drive bay of FIGS. 2a and 2b.
Figure 3B:
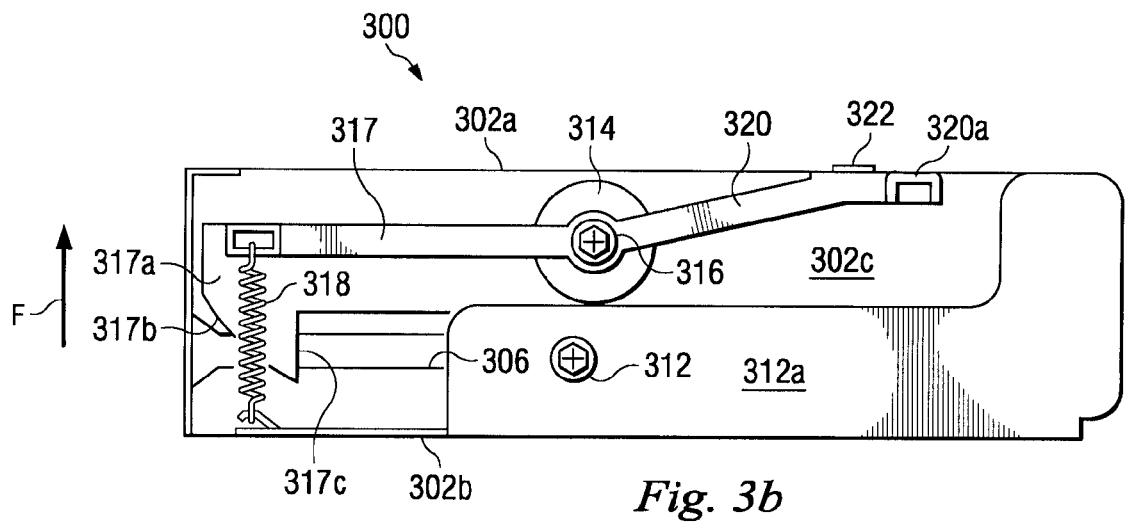

Referring now to FIGS. 3a and 3b, an interposer apparatus 300 is illustrated. The interposer apparatus 300 includes a secondary drive chassis 302 having a top wall 302a, a bottom wall 302b located opposite the top wall 302a, and a pair of opposing side walls 302c and 302d extending between the top wall 302a and the bottom wall 302b. A secondary drive housing 304 is defined between the top wall 302a, the bottom wall 302b, and the side walls 302c and 302d. The secondary drive housing 304 defines a second housing volume that is smaller than the first housing volume, described above with reference to FIGS. 2a and 2b. A secondary drive channel 306 is defined by the side wall 302c and extends along the length of the side wall 302c. A secondary drive channel 308 is defined by the side wall 302d, extends along the length of the side wall 302d, and is substantially aligned with the secondary drive channel 306. A plurality of interference fit members 310 extend from the top wall 302a and the bottom wall 302b and into the secondary drive housing 304. A guide post 312 extends from a guide post support wall 312a that extends from the side wall 302c. A guide post (not shown) may also be coupled to and/or extend from the side wall 302d. The secondary drive chassis 302 includes dimensions such that the guide post 312 may couple the secondary drive chassis 302 to the drive bay 200 in one of the primary drive housings, illustrated in FIGS. 2a and 2b. In an embodiment, a secondary drive coupling mechanism includes a latch 314 that is rotatably coupled to the side wall 302c on a rotational coupling 316. An arm 317 extends from the latch 314 and includes a latch activation member 317a located on its distal end. The latch activation member 317a includes an activation surface 317b and a securing surface 317c, each located adjacent the secondary drive channel 306. A spring 318 is coupled to the latch activation member 316 and the bottom wall 302b in order to resiliently bias the latch activation member 317a into a location adjacent the secondary drive channel 306. A release handle 320 extends from the latch 314 opposite the arm 316 and includes a release surface 320a located on its distal end. A stop member 322 extends from the top wall 302a and engages the release handle 320 in order to prevent rotation of the latch 314 when the spring 318 resiliently biases the latch activation member 317a.

Figure 4:
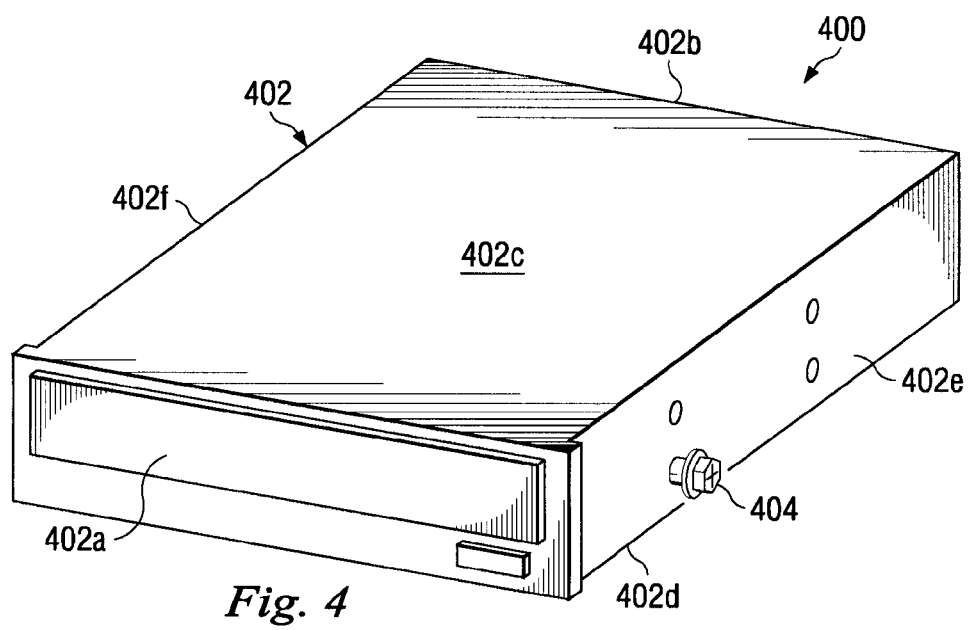
FIG. 4 is a perspective view illustrating an embodiment of a primary drive used with the drive bay of FIGS. 2a and 2b.

Referring now to FIG. 4, a primary drive 400 is illustrated. The primary drive 400 includes a base 402 having a front surface 402a, a rear surface 402b located opposite the front surface 402a, a top surface 402c extending between the front surface 402a and the rear surface 402b, a bottom surface 402d located opposite the top surface 402c and extending between the front surface 402a and the rear surface 402b, and a pair of opposing side surfaces 402e and 402f extending between the front surface 402a, the rear surface 402b, the top surface 402c, and the bottom surface 402d. A guide post 404 extends from the side surface 402e. A guide post (not illustrated) may also extend from the side surface 402f. The primary drive 400 is a primary drive volume and includes dimensions such that the guide post 404 may couple the primary drive 400 to the drive bay 200 in one of the primary drive housings, illustrated in FIGS. 2a and 2b. In an embodiment, the primary drive 400 may be an optical drive.

Figure 5:
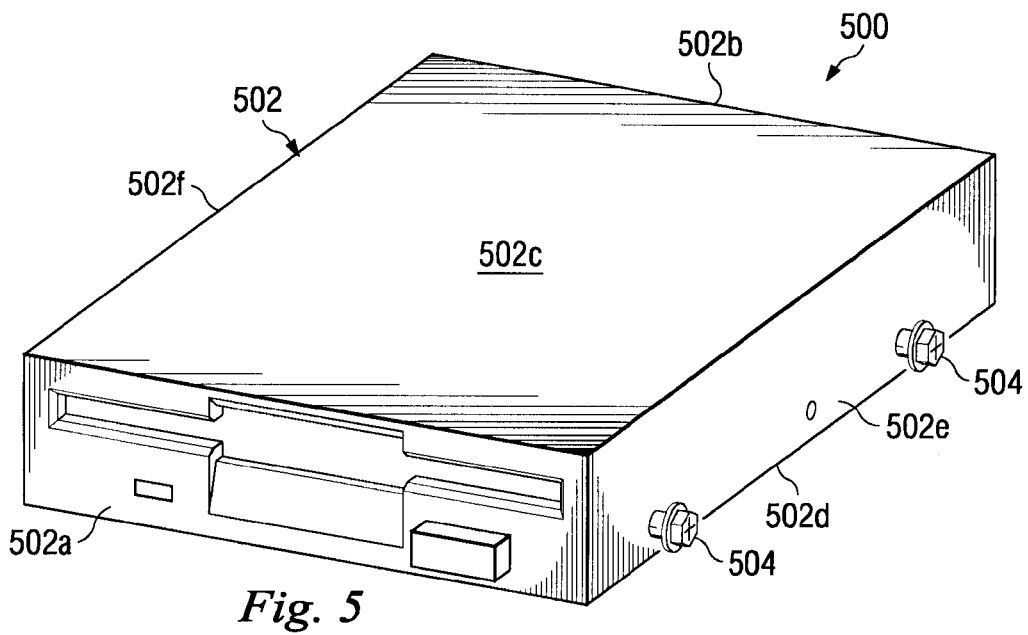
FIG. 5 is a perspective view illustrating an embodiment of a secondary drive used with the drive bay of FIGS. 2a and 2b and the interposer apparatus of FIGS. 3a and 3b.

Referring now to FIG. 5, a secondary drive 500 is illustrated. The secondary drive 500 includes a base 502 having a front surface 502a, a rear surface 502b located opposite the front surface 502a, a top surface 502c extending between the front surface 502a and the rear surface 502b, a bottom surface 502d located opposite the top surface 502c and extending between the front surface 502a and the rear surface 502b, and a pair of opposing side surfaces 502e and 502f extending between the front surface 502a, the rear surface 502b, the top surface 502c, and the bottom surface 502d. A plurality of guide posts 504 extends from the side surface 502e. A guide post (not illustrated) may also extend from the side surface 502f. The secondary drive 500 is a secondary drive volume that is smaller than the primary drive volume, described above with reference to FIG. 4, and includes dimensions such that the guide post 504 may couple the secondary drive 500 to the interposer apparatus 300 in the secondary drive housing, illustrated in FIGS. 3a and 3b. In an embodiment, the secondary drive 500 may be a floppy drive, a card reader, a ZIP drive, and/or a variety of other drives known in the art.

Figure 6A:
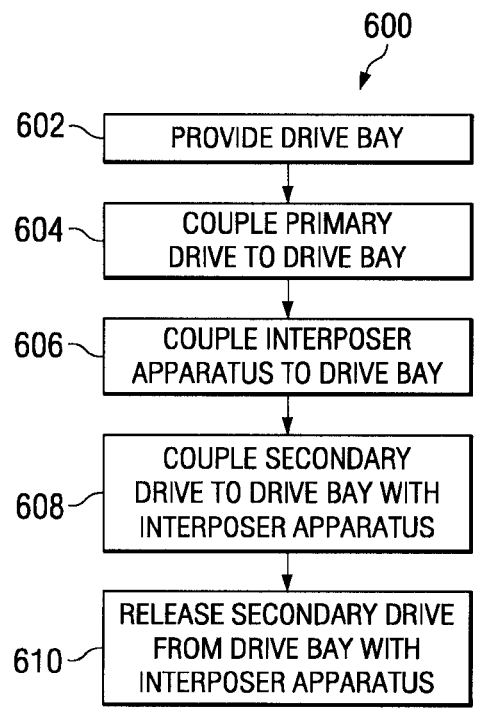
FIG. 6a is a flow chart illustrating an embodiment of a method for coupling a drive to a drive bay.
Figure 6B:
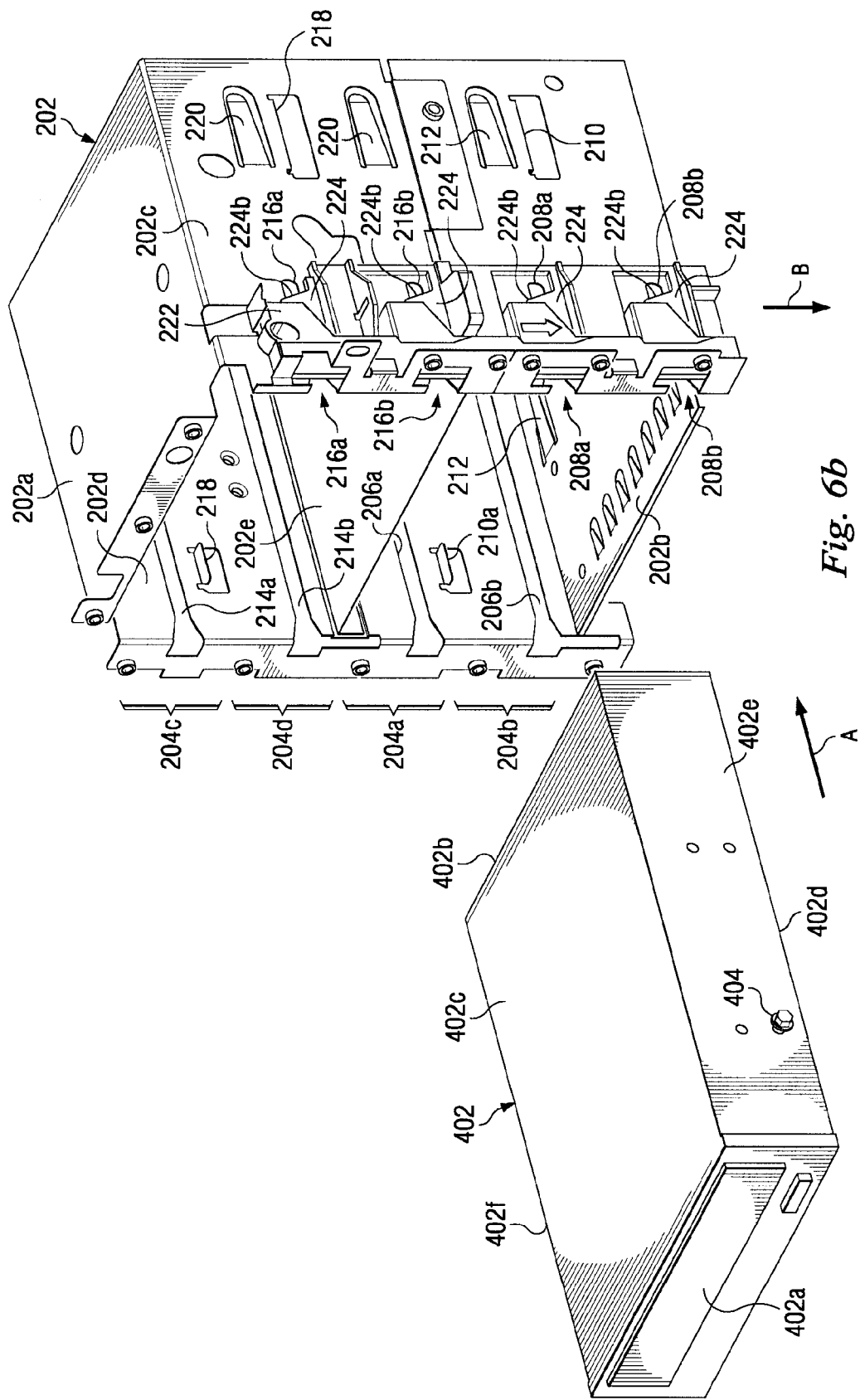
FIG. 6b is a perspective view illustrating an embodiment of the primary drive of FIG. 4 being coupled to the drive bay of FIGS. 2a and 2b.
Figure 6C:
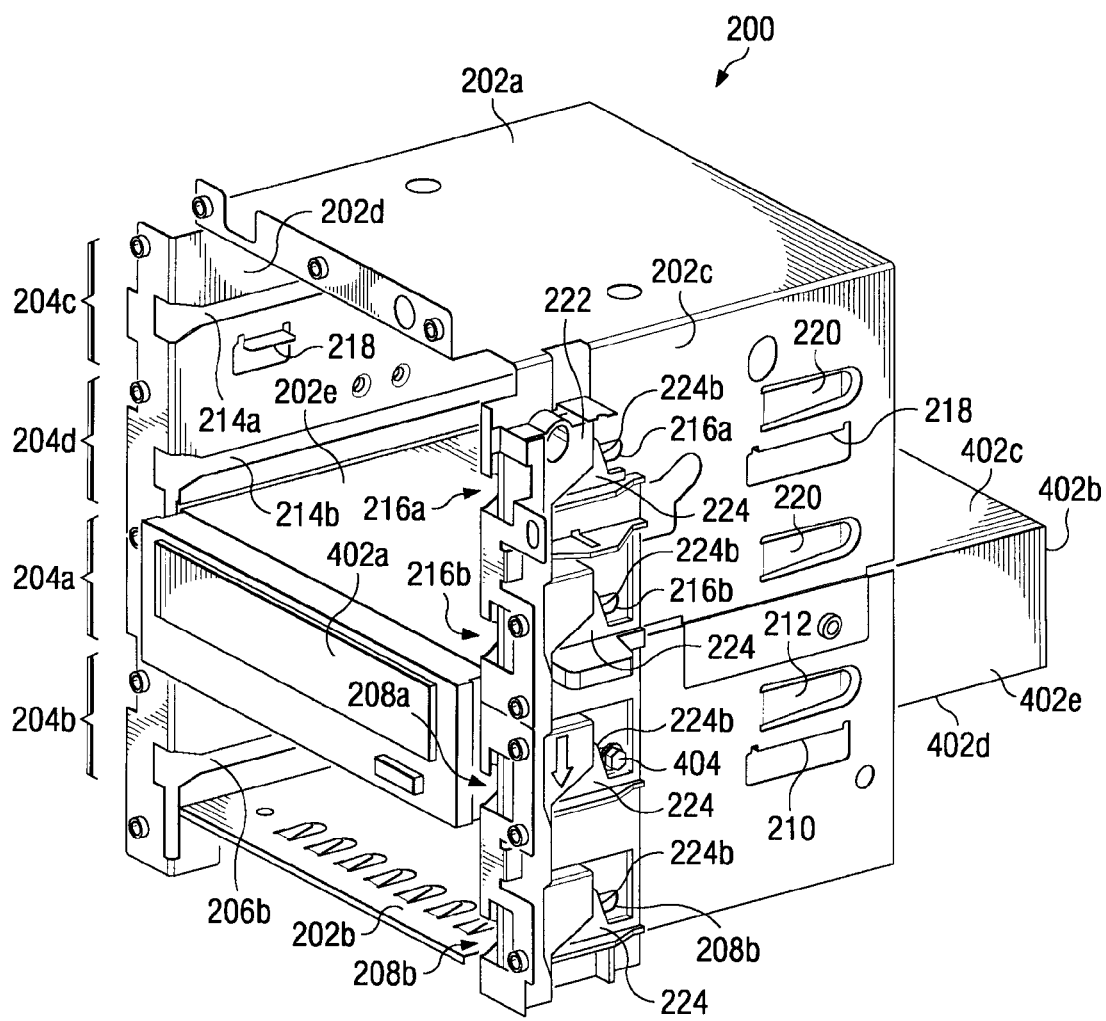
FIG. 6c is a perspective view illustrating an embodiment of the primary drive of FIG. 4 coupled to the drive bay of FIGS. 2a and 2b.

Referring now to FIGS. 2a, 2b, 4, 6a, 6b and 6c, a method 600 for coupling a drive to a drive bay is illustrated. The method 600 begins at step 602 where the drive bay 200, illustrated in FIGS. 2a and 2b, is provided. The drive bay 200 may be located in an IHS chassis such as, for example, the chassis 116, described above with reference to FIG. 1, and may include or be located adjacent connectors that are electrically coupled to IHS components such as, for example, the processor 102, described above with reference to FIG. 1. The method 600 then proceeds to step 604 where the primary drive 400 is coupled to the drive bay 200 without the use of a tool. The primary drive 400 is positioned adjacent the primary drive housing 204a defined by the drive bay 200 such that the rear surface 402b of the primary drive 400 is located adjacent the primary drive housing 204a with the top surface 402c of the primary drive 400 located adjacent the middle wall 202e on the drive bay 200, and the side surfaces 402e and 402f of the primary drive 400 located adjacent the side walls 202c and 202d, respectively, of the drive bay 200. With the primary drive 400 located adjacent the primary drive housing 204a, the guide post 202 on the side surface 402e of the primary drive 400 is aligned with the drive channel 208a defined by the side wall 202c and the guide post (not shown) on the side surface 402f of the primary drive 400 is aligned with the drive channel 206a defined by the side wall 202d, as illustrated in FIG. 6b. The primary drive 400 is then moved in a direction A such that the primary drive 400 enters the primary drive housing 204a, the guide post 404 engages the drive channel 208a, and the guide post (not shown) on side surface 402f engages the drive channel 206a. Continued movement of the primary drive 400 in the direction A results in the guide post 404 engaging the beveled surface 224a on the securing member 224 located adjacent the drive channel 208a such that the primary drive coupling mechanism 222 moves in a direction B. Movement of the primary drive coupling mechanism 222 in the direction B allows the guide post 404 to continue to move in the direction A such that the guide post 404 moves past the beveled surface 224a and engages the end of the drive channel 208a. Movement of the guide post 404 past the beveled surface 224a allows the primary drive coupling mechanism 222 to move in a direction opposite the direction B such that securing surface 224b on the securing member 224 engages the guide post 404 and secures the primary drive 400 in the primary drive housing 204a, as illustrated in FIG. 6c. In an embodiment, the securing of the primary drive 400 in the drive bay 200 results in the primary drive 400 being electrically coupled to a connector located adjacent or coupled to the drive bay 200.

Figure 6D:
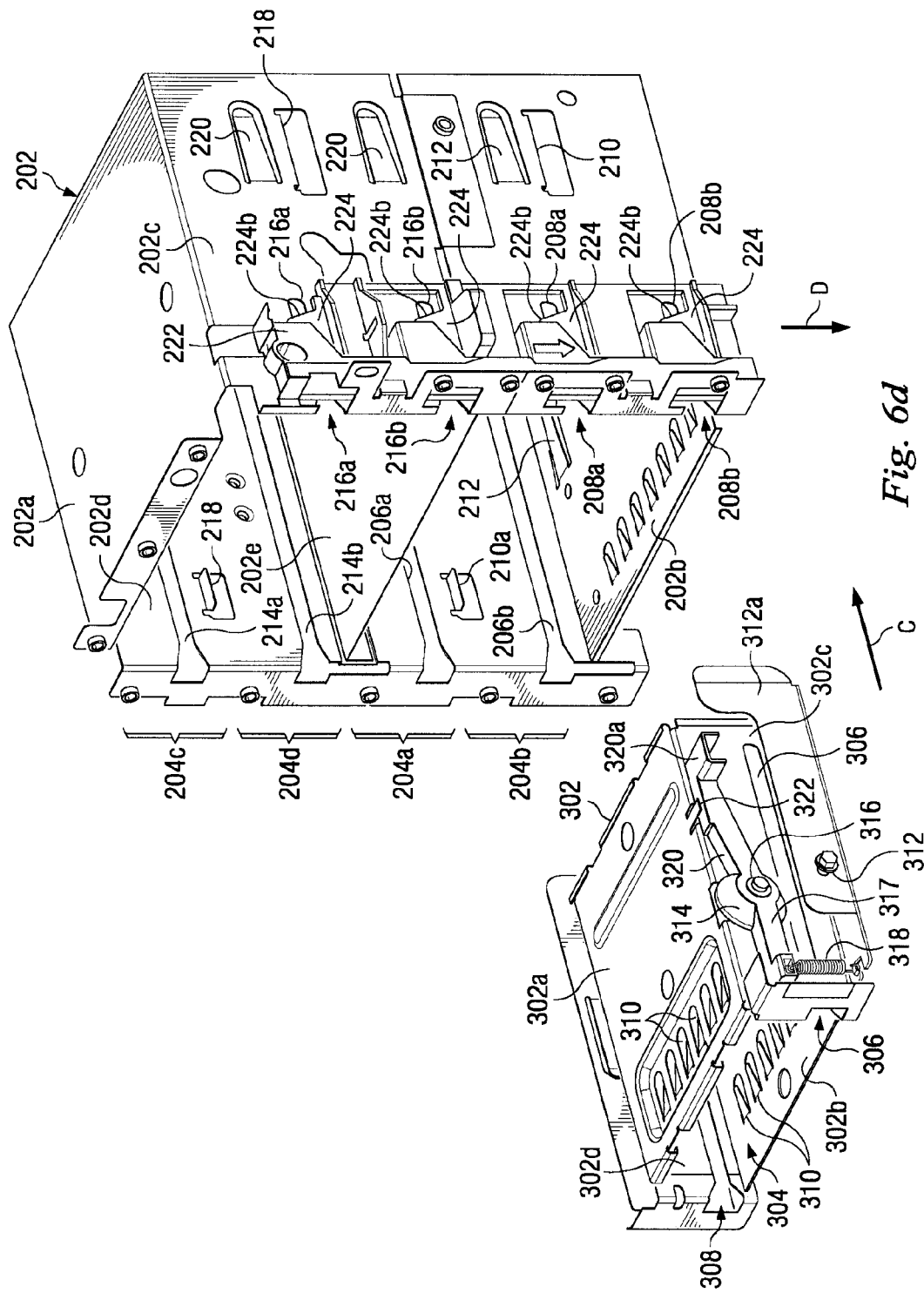
FIG. 6d is a perspective view illustrating an embodiment of the interposer apparatus of FIGS. 3a and 3b being coupled to the drive bay of FIGS. 2a and 2b.
Figure 6E:
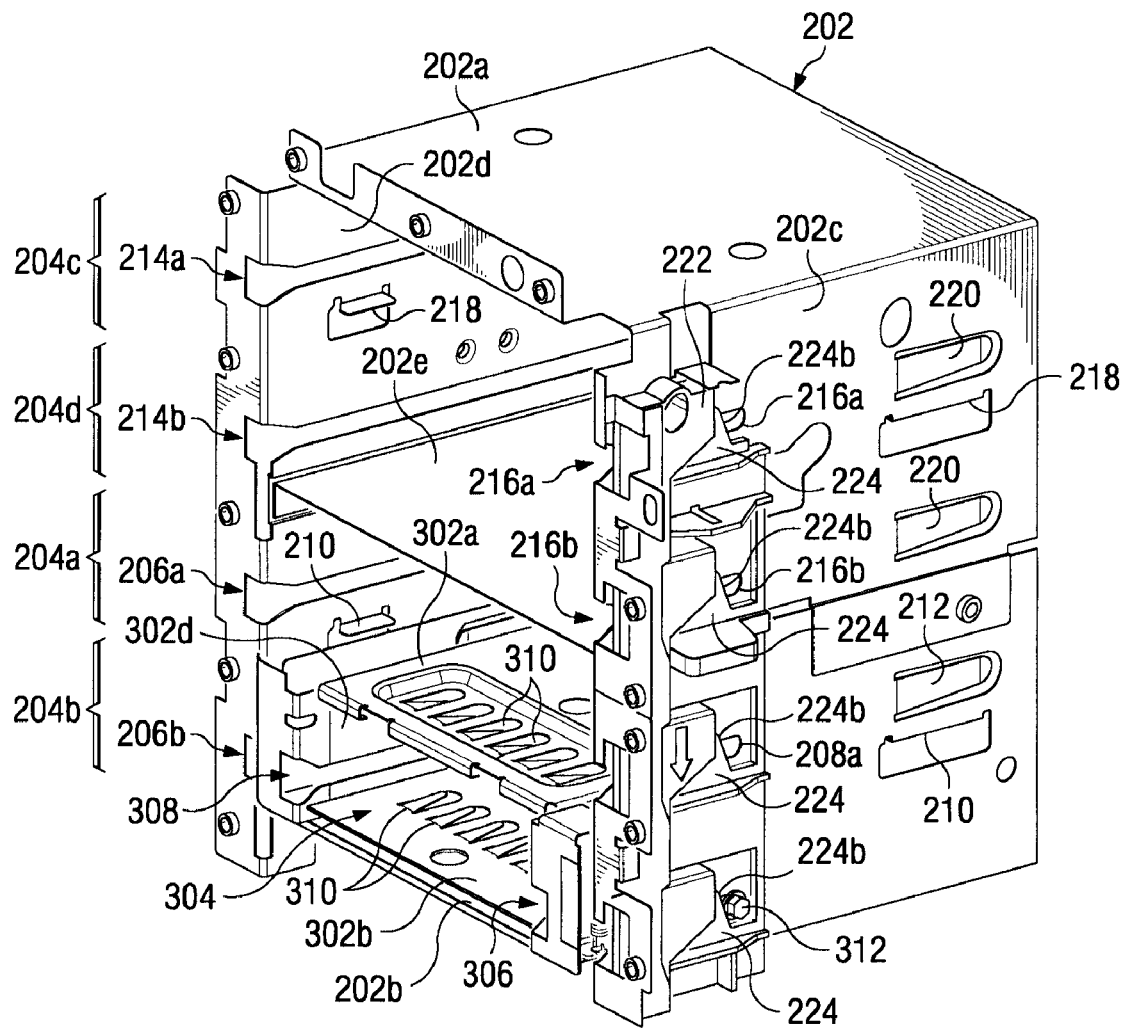
FIG. 6e is a perspective view illustrating an embodiment of the interposer apparatus of FIGS. 3a and 3b coupled to the drive bay of FIGS. 2a and 2b.

Referring now to FIGS. 2a, 2b, 3a, 3b, 6a, 6d and 6e, the method 600 proceeds to step 606 where the interposer apparatus 300 is coupled to the drive bay 200 without the use of a tool. In the FIGS. 6d and 6e, the primary drive 400, coupled to the drive bay 200 in step 604, has been removed for clarity. The secondary drive chassis 302 is positioned adjacent the primary drive housing 204b defined by the drive bay 200 such that the bottom wall 302b of the secondary drive chassis 302 is located adjacent the bottom wall 202b of the drive bay 200 and the side walls 302c and 302d of the secondary drive chassis 302 are located adjacent the side walls 202c and 202d, respectively, of the drive bay 200. With the secondary drive chassis 302 located adjacent the primary drive housing 204b, the guide post 312 on secondary drive chassis 302 is aligned with the drive channel 208b defined by the side wall 202c and the guide post (not shown) coupled to the side wall 302d of the secondary drive chassis 302 is aligned with the drive channel 206b defined by the side wall 202d, as illustrated in FIG. 6d. The secondary drive chassis 302 is then moved in a direction C such that the secondary drive chassis 302 enters the primary drive housing 204b, the guide post 312 engages the drive channel 208b, and the guide post (not shown) coupled to the side wall 302d engages the drive channel 206b. Continued movement of the secondary drive chassis 302 in the direction C results in the guide post 312 engaging the beveled surface 224a on the securing member 224 located adjacent the drive channel 208b such that the primary drive coupling mechanism 222 moves in a direction D. Movement of the primary drive coupling mechanism 222 in the direction D allows the guide post 312 to continue to move in the direction C such that the guide post 312 moves past the beveled surface 224a and engages the end of the drive channel 208b. Movement of the guide post 312 past the beveled surface 224a allows the primary drive coupling mechanism 222 to move in a direction opposite the direction D such that securing surface 224b on the securing member 224 engages the guide post 312 and secures the secondary drive chassis 302 in the primary drive housing 204b, as illustrated in FIG. 6e.

Figure 6F:
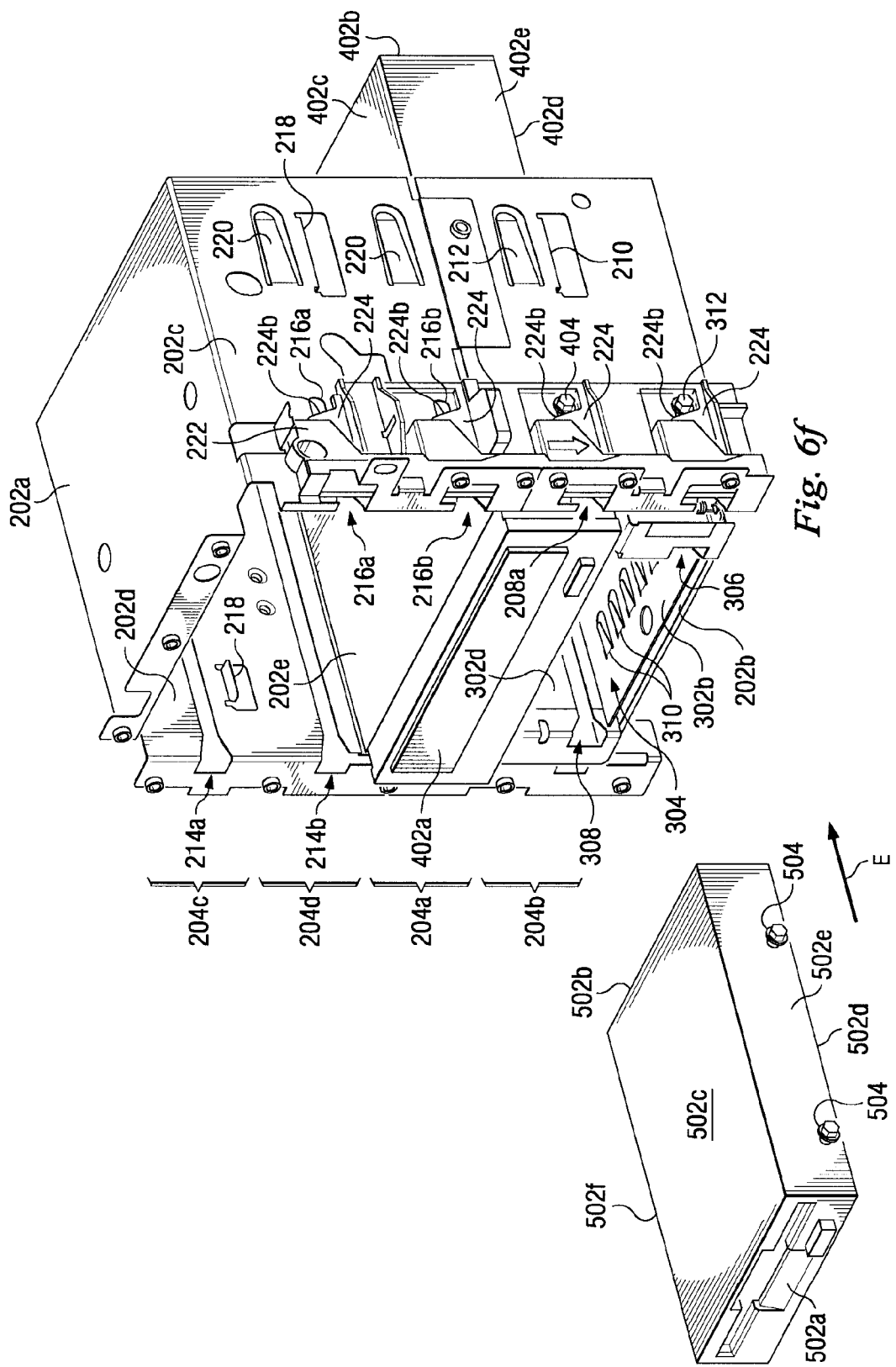
FIG. 6f is a perspective view illustrating an embodiment of the secondary drive of FIG. 5 being coupled to the drive bay and interposer apparatus of FIG. 6e.
Figure 6G:
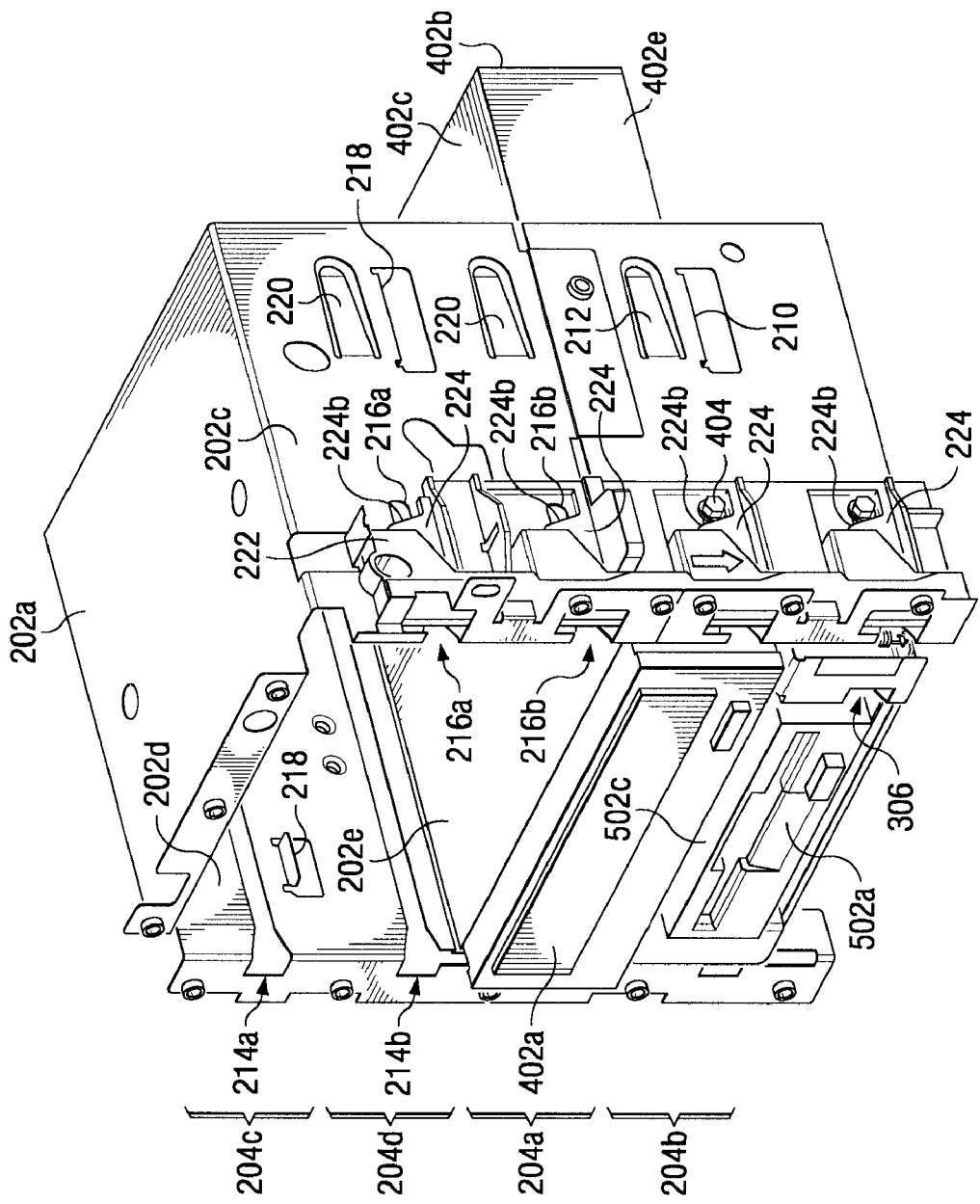
FIG. 6g is a perspective view illustrating an embodiment of the secondary drive of FIG. 5 coupled to the drive bay and interposer apparatus of FIG. 6e.
Figure 6H:
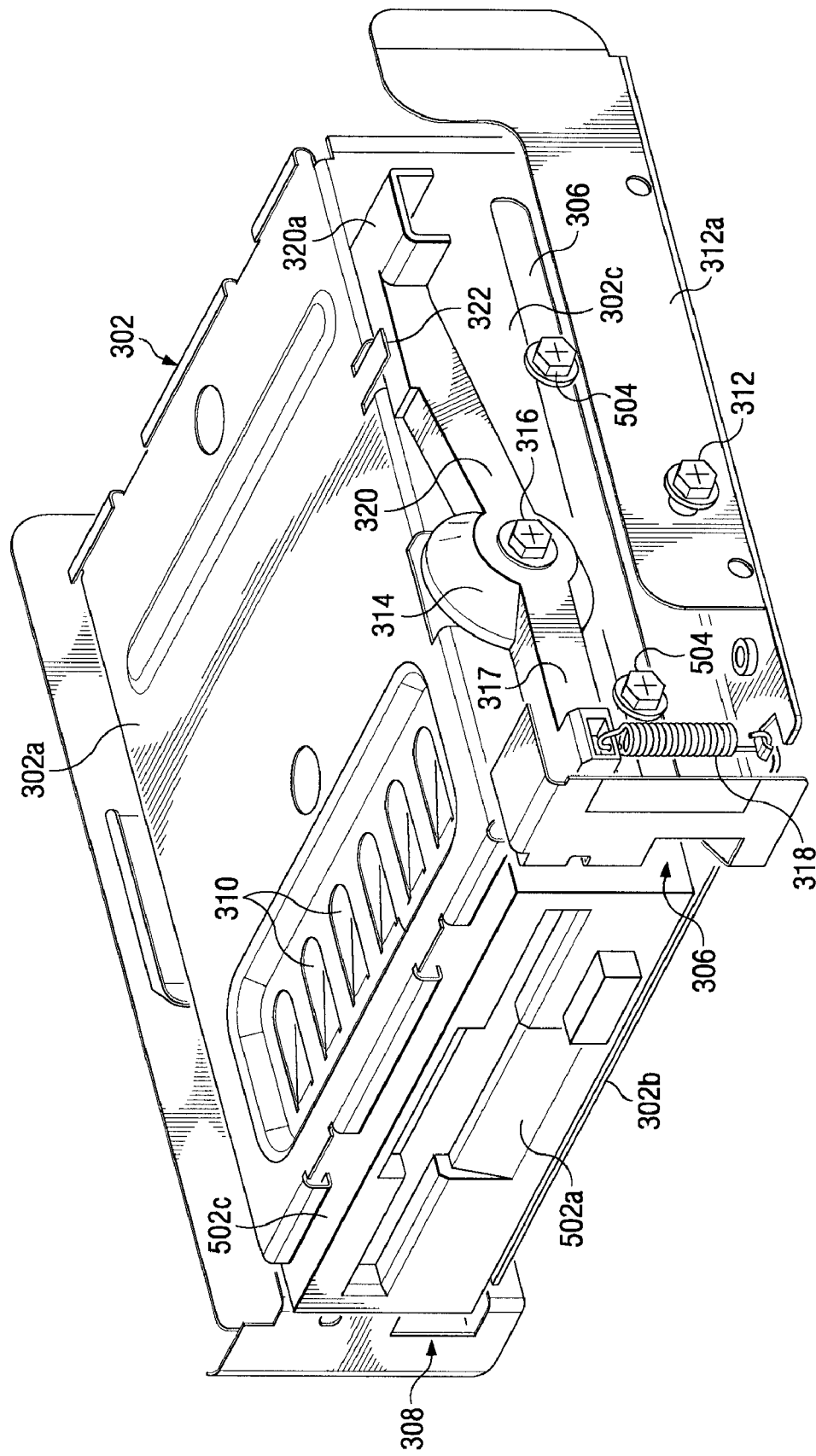
FIG. 6h is a perspective view illustrating an embodiment of the secondary drive of FIG. 5 coupled to the interposer apparatus of FIGS. 3a and 3b.

Referring now to FIGS. 2a, 2b, 3a, 3b, 5, 6a, 6f, 6g and 6h, the method 600 proceeds to step 608 where the secondary drive 500 is coupled to the drive bay 200 with the interposer apparatus 300 without the use of a tool. The secondary drive 500 is positioned adjacent the secondary drive housing 304 defined by the secondary drive chassis 302 such that the rear surface 502b of the secondary drive 500 is located adjacent the secondary drive housing 304 with the bottom surface 502d of the secondary drive 500 located adjacent the bottom wall 202b on the drive bay 200, and the side surfaces 502e and 502f of the secondary drive 500 located adjacent the side walls 202c and 202d, respectively, of the drive bay 200. With the secondary drive 500 located adjacent the secondary drive housing 304, the guide posts 504 on the side surface 502e of the secondary drive 500 are aligned with the drive channel 306 defined by the side wall 302c of the secondary drive chassis 302 and the guide posts (not shown) on the side surface 502f of the secondary drive 500 are aligned with the drive channel 308 defined by the side wall 302d of the secondary drive chassis 302, as illustrated in FIG. 6f. The secondary drive 500 is then moved in a direction E such that the secondary drive 500 enters the secondary drive housing 304, the guide post 504 engages the secondary drive channel 306, and the guide post (not shown) on the side surface 502f engages the secondary drive channel 308. Continued movement of the secondary drive 500 in the direction E results in the guide posts 504 engaging the activation surface 317b on the latch activation member 317a such that the latch 314 is rotated about its rotational coupling 316 and latch activation member 317a moves in a direction F, illustrated in FIG. 3b, such that the latch activation member 317a is no longer adjacent the secondary drive channel 306 and the secondary drive may continue to move in the direction E. Further movement of the secondary drive 500 in the direction E results in one of the guide posts 504 engaging an end of the secondary drive channel 306 while the latch activation member 317a is biased back into a position adjacent the secondary drive channel 306 such that the securing surface 317c on the latch activation member 317a engages the other guide post 504 and secures the secondary drive 500 in the drive bay 200, as illustrated in FIGS. 6g and 6h.

Referring now to FIGS. 2a, 2b, 3a, 3b, 5, 6a, 6f, 6g and 6h, the method 600 proceeds to step 610 where the secondary drive 500 is released from the drive bay 200 with the interposer apparatus 300. When it is desired to remove the secondary drive 500 from the drive bay 200, the release surface 320a on the release handle 320 is engaged such that the latch 314 is rotated about its rotational coupling 314 and the latch activation member 317a moves in a direction F, illustrated in FIG. 3b, such that the latch activation member 317a is no longer adjacent the secondary drive channel 306. The secondary drive 500 may then be moved in a direction opposite the direction E, illustrated in FIG. 6f, and removed from the drive bay 200. Further more, if it is desired to remove the primary drive 400 from the drive bay 200, the primary drive coupling mechanism 222 is moved in the direction B, illustrated in FIG. 6b, such that the securing member 224 is no longer adjacent the drive channel 208a and the primary drive 400 is moved in a direction opposite the direction A, illustrated in FIG. 6b, and removed from the drive bay 200. Thus, a method and apparatus are provided that allow a secondary drive 500 to be coupled to a drive bay 200 without the use of a tool using an interposer apparatus 300 that allows the secondary drive 500 to be decoupled from the drive bay 200 without removing the interposer apparatus 300 from the drive bay 200. The interposer apparatus 300 may be coupled to the drive bay 200 in the primary drive housings depending on what type of drives are desired in the drive bay 200, and then drives may be swapped in and out of the drive bay 200 without having to remove the interposer apparatus 300 from the drive bay 200.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An interposer apparatus, comprising:
    a secondary drive chassis comprising dimensions such that the secondary drive chassis is operable to couple to a drive bay without the use of a tool and be housed in a primary drive housing defined by the drive bay, the primary drive housing including a first housing volume;
    a secondary drive housing defined by the secondary drive chassis, the secondary drive housing including a second housing volume that is smaller than the first housing volume;
    a secondary drive coupling mechanism on the secondary drive chassis that is operable to couple a secondary drive to the secondary drive chassis and in the secondary drive housing without the use of a tool, whereby the secondary coupling mechanism may be activated to release a secondary drive from the secondary drive chassis while the secondary drive chassis is still coupled to the drive bay and housed in the primary drive housing defined by the drive bay; and
    a guide post extending from a plurality of opposing surfaces on the secondary drive chassis, whereby each guide post is locatable in a respective guide channel defined by a drive bay to couple the secondary drive chassis to the drive bay.

2. The apparatus of claim 1, wherein the secondary drive coupling mechanism comprises a latch rotatably coupled to the secondary drive chassis.

3. The apparatus of claim 2, wherein the latch is resiliently biased into a location adjacent the guide channel.

4. The apparatus of claim 3, wherein the secondary drive coupling mechanism comprises a release surface which may be engaged to remove the latch from the location adjacent the guide channel.

5. The apparatus of claim 1, further comprising:
    a drive bay defining a plurality of primary drive housings, whereby the secondary drive chassis is coupled to the drive bay and located in one of the primary drive housings.

6. The apparatus of claim 5, wherein the drive bay includes a primary drive coupling mechanism, whereby the primary drive coupling mechanism couples the secondary drive chassis to the drive bay without the use of a tool and is operable to couple a primary drive to the drive bay without the use of a tool.

7. The apparatus of claim 5, wherein a primary drive is coupled to the drive bay and located in one of the primary drive housings and a secondary drive is coupled to the secondary drive chassis and located in the secondary drive housing, whereby the secondary drive is smaller in volume than the primary drive.

8. An information handling system (IHS), comprising:
    an IHS chassis;
    a processor coupled to the IHS chassis;
    a drive bay mounted to the IHS chassis and defining a plurality of primary drive housings each including a first housing volume; and
    an interposer apparatus coupled to the drive bay, the interposer apparatus comprising:
        a secondary drive chassis coupled to the drive bay without the use of a tool and comprising dimensions such that the secondary drive chassis is located in one of the primary drive housings;
        a secondary drive housing defined by the secondary drive chassis, the secondary drive housing including second housing volume that is smaller than the first housing volume;
        a secondary drive coupling mechanism on the secondary drive chassis that is operable to couple a secondary drive to the secondary drive chassis and in the secondary drive housing without the use of a tool, whereby the secondary coupling mechanism may be activated to release a secondary drive from the secondary drive chassis while the secondary drive chassis is still coupled to the drive bay and housed in the primary drive housing defined by the drive bay; and a guide post extending from a plurality of opposing surfaces on the secondary drive chassis, whereby each guide post is located in a respective guide channel defined by the drive bay to couple the secondary drive chassis to the drive bay.

9. The system of claim 8, wherein the secondary drive coupling mechanism comprises a latch rotatably coupled to the secondary drive chassis.

10. The system of claim 9, wherein the latch is resiliently biased into a location adjacent the guide channel.

11. The system of claim 10, wherein the secondary drive coupling mechanism comprises a release surface which may be engaged to remove the latch from the location adjacent the guide channel.

12. The system of claim 8, wherein the drive bay includes a primary drive coupling mechanism, whereby the primary drive coupling mechanism couples the secondary drive chassis to the drive bay without the use of a tool and is operable to couple a primary drive to the drive bay without the use of a tool.

13. The system of claim 8, wherein a primary drive is coupled to the drive bay and located in one of the primary drive housings and a secondary drive is coupled to the secondary drive chassis and located in the secondary drive housing, whereby the secondary drive is smaller in volume than the primary drive.

14. The system of claim 13, wherein the primary drive is an optical drive.

15. The system of claim 13, wherein the primary drive and the secondary drive are both electrically coupled to the processor.

16. An interposer apparatus, comprising:
a drive bay defining a primary drive housing and a primary drive guide channel located adjacent the primary drive housing, the primary drive housing including a first housing volume;
a primary drive coupling mechanism moveably coupled to the drive bay such that a securing member on the primary drive coupling mechanism may be resiliently moved from a location adjacent the primary drive channel to a location that is not adjacent the primary drive channel;
a secondary drive chassis housed in the primary drive housing defined by the drive bay and secured in the drive bay through the engagement of the secondary drive chassis and the securing member on the primary drive coupling mechanism;
a secondary drive housing defined by the secondary drive chassis, the secondary drive housing including a second housing volume that is smaller than the first housing volume;
a secondary drive channel defined by the secondary drive chassis and located adjacent the secondary drive housing; and
a secondary drive coupling mechanism moveably coupled to the secondary drive chassis such that an activation member on the secondary drive coupling mechanism may be resiliently moved from a location adjacent the secondary drive channel to a location that is not adjacent the secondary drive channel, whereby the secondary coupling mechanism may be activated to release a secondary drive from the secondary drive chassis while the secondary drive chassis is still coupled to the drive bay and housed in the primary drive housing defined by the drive bay.

17. An interposer apparatus, comprising:
a secondary drive chassis comprising dimensions such that the secondary drive chassis is operable to couple to a drive bay without the use of a tool and be housed in a primary drive housing defined by the drive bay, the primary drive housing including a first housing volume;
a secondary drive housing defined by the secondary drive chassis, the secondary drive housing including a second housing volume that is smaller than the first housing volume; and
a secondary drive coupling mechanism on the secondary drive chassis that is operable to couple a secondary drive to the secondary drive chassis and in the secondary drive housing without the use of a tool, whereby the secondary coupling mechanism may be activated to release a secondary drive from the secondary drive chassis while the secondary drive chassis is still coupled to the drive bay and housed in the primary drive housing defined by the drive bay, wherein the secondary drive coupling mechanism comprises a latch rotatably coupled to the secondary drive chassis, wherein the secondary drive chassis defines at least one guide channel whereby the latch is resiliently biased into a location adjacent the guide channel and wherein the secondary drive coupling mechanism comprises a release surface which may be engaged to remove the latch from the location adjacent the guide channel.

18. An information handling system (IHS), comprising:
an IHS chassis;
a processor coupled to the IHS chassis;
a drive bay mounted to the IHS chassis and defining a plurality of primary drive housings each including a first housing volume; and
an interposer apparatus coupled to the drive bay, the interposer apparatus comprising:
a secondary drive chassis coupled to the drive bay without the use of a tool and comprising dimensions such that the secondary drive chassis is located in one of the primary drive housings;
a secondary drive housing defined by the secondary drive chassis, the secondary drive housing including a second housing volume that is smaller than the first housing volume; and
a secondary drive coupling mechanism on the secondary drive chassis that is operable to couple a secondary drive to the secondary drive chassis and in the secondary drive housing without the use of a tool, whereby the secondary coupling mechanism may be activated to release a secondary drive from the secondary drive chassis while the secondary drive chassis is still coupled to the drive bay and housed in the primary drive housing defined by the drive bay, wherein the secondary drive coupling mechanism comprises a latch rotatably coupled to the secondary drive chassis, wherein the secondary drive chassis defines at least one guide channel whereby the latch is resiliently biased into a location adjacent the guide channel and wherein the secondary drive coupling mechanism comprises a release surface which may be engaged to remove the latch from the location adjacent the guide channel.

* * * * *

UNITED STATES PATENT AND TRADEMARK OFFICE
CERTIFICATE OF CORRECTION

| | | |
|---|---|---|
| PATENT NO. | : 7,460,365 B2 | Page 1 of 1 |
| APPLICATION NO. | : 11/537695 | |
| DATED | : December 2, 2008 | |
| INVENTOR(S) | : William Morris | |

It is certified that error appears in the above-identified patent and that said Letters Patent is hereby corrected as shown below:

Claim 8, Column 8, Lines 61-62, after the word including insert --a--.

Signed and Sealed this

Fifth Day of May, 2009

JOHN DOLL
*Acting Director of the United States Patent and Trademark Office*